L. F. DALTON.
AUTOMOBILE STOP SIGNAL.
APPLICATION FILED APR. 28, 1920.
1,376,746.
Patented May 3, 1921.
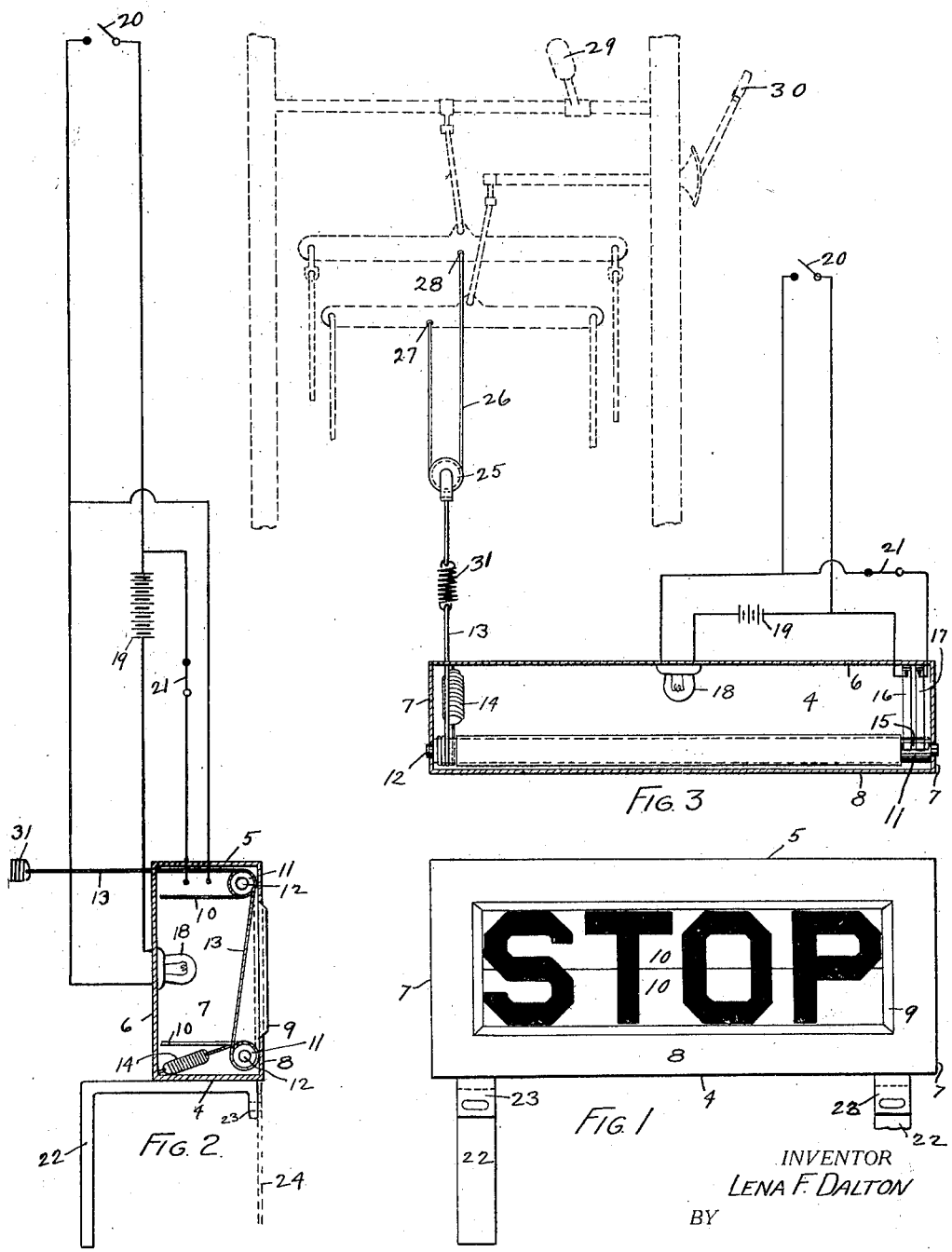
INVENTOR
LENA F. DALTON
BY
Edward B. Birkenbeul.
ATTORNEY

UNITED STATES PATENT OFFICE.

LENA F. DALTON, OF PORTLAND, OREGON.

AUTOMOBILE STOP-SIGNAL.

1,376,746.   Specification of Letters Patent.   Patented May 3, 1921.

Application filed April 28, 1920. Serial No. 377,222.

*To all whom it may concern:*

Be it hereby known that I, LENA F. DALTON, a citizen of the United States, and a resident of Portland, in the county of Multnomah and State of Oregon, have invented a new and useful Automobile Stop-Signal, of which the following is a specification.

This invention relates more particularly to a means for automatically indicating the slowing down of an automobile.

The object of my invention is to reduce the dangers from rear-end collisions due to a sudden stopping of an automobile without warning the driver of the following vehicles.

To accomplish this result I have constructed my device in the manner described in the specification following and illustrated in the accompanying drawing, in which:—

Figure 1 is an elevation of the device showing its appearance when the vehicle has been brought to a stop. Fig. 2 is a sectional elevation of the device showing a diagram of the wiring. Fig. 3 is a sectional plan, including a wiring diagram, and showing the connections to the existing parts of the automobile which operate my device.

Referring in detail to the drawing, I have constructed a case which contains the working parts of my device of which 4 is the floor of the case, 5 the top, 6 the back, 7 the sides, and 8 the front whose opening is occupied by the glass 9.

On the upper and lower forward edges of the case I have hinged the transparent shutters 10, which, when closed, meet exactly at the center of the glass 9. Each of these shutters is mounted on a wooden roller 11, which, in turn, pivots on the axis 12 journaled in the side members 7. It will be observed that the shutters 10 curl around the wooden rollers 11 and are secured thereto, but do not occupy the full width of the roller; that is, on one end a portion of the exposed roller's surface has a drum about which the flexible cable 13 is wound, as indicated in Fig. 2, and terminates within the case in the tension spring 14 secured to the lower rearmost edge of the case.

It will be observed that a pull on the cable 13 from without the case will tend to close both of the shutters 10.

On the opposite end of the roller 11 is mounted a commutator segment 15, which, when the shutters 10 are closed, comes in contact with the arm 16 mounted on and insulated from the back member 6 and wired to a pole of the battery which ordinarily supplies current to the tail light. Mounted alongside of the arm 16 is a second arm 17 similarly mounted, but wired to the tail lamp 18 mounted on the back 6 and thence to the battery 19.

It will be evident that when the shutters 10 are closed that the commutator 15 will close the lamp circuit, for when desiring to keep the lamp lighted as at night when the car is running the usual tail light switch 20 on the dash of the car is closed. I have also provided a switch 21 in the first mentioned circuit which is normally kept closed when the car is running in the daytime and open when stopping so that when the car is stopped that the tail light will not be left burning.

I have mounted the case of my device on a pair of brackets 22 attached to the automobile in the most convenient manner, and have turned down the rearward end of the bracket 22 at 23, which is directly underneath the front 8 of the case. This provides an excellent bracket for license tags, while at the same time rendering more conspicuous the location of my signaling device.

The operating cable 13 which projects from the rear of the back 6 is attached to an equalizing sheave 25 about which is passed the equalizing cable 26, one end, 27, of which is attached to the equalizing bar of the emergency brake, and the other end, 28, of which is attached to the equalizing bar of the service brake, which I have indicated as 29, while the hand brake is indicated as 30. In order to prevent destruction of the device by an application of both of the brakes 29 and 30 at the same time I have interposed the spring 31 in the cable 13 for obvious reasons.

In operating a car equipped with my device the driver, it is assumed, will apply either of his brakes before or after the car has come to a stop (in most cases before) and this act automatically flashes the stop signal, which is transparent, and at the same time draws further attention to the warning by flashing the light 18, which ordinarily serves for a tail light, and its red color will attract attention even in broad day light.

While I have indicated a means for attracting attention to the warning in the form of a lamp, it is apparent that this may be substituted, or even assisted, by an audible alarm means in the form of a bell or horn without departing from the spirit of my invention.

While I have thus illustrated and described my device it is not my intention to limit myself to this precise form or method of application, but intend that it shall cover all forms and modifications that fall fairly within the appended claims.

What I claim as new and desire to protect by Letters Patent of the United States, is:

1. In an auto stop signal, the combination of a box member having one transparent side with a pair of transparent shutters hinged at the upper and lower margins of said transparent side and adapted to meet at its center, said transparent shutters bearing an opaque warning signal, and a means for swinging said shutter against the transparent side consisting of a cable attached to a spring in said box and then wound around a hub on the lower shutter, thence in a counter direction around a hub on the upper shutter, then secured to the brake mechanism in a manner which will close said shutters when the brakes are applied.

2. In an auto stop signal, the combination of a box member having one transparent side with a pair of transparent shutters hinged at the upper and lower margins of said transparent box side and adapted to meet at its center, said transparent shutters bearing an opaque warning signal, and a means for swinging said shutters against the transparent side consisting of a cable attached to a spring in said box and then wound around a hub on the lower shutter, thence in a counter direction around a hub on the upper shutter and then secured to brake mechanism in a manner which will close said shutters when the brakes are applied, and a tail light contained within said box.

LENA F. DALTON.